(12) United States Patent
Herzog et al.

(10) Patent No.: US 11,698,117 B2
(45) Date of Patent: Jul. 11, 2023

(54) BRAKING SYSTEMS COMPRISING ARTIFICIAL MUSCLES

(71) Applicant: Toyota Motor Engineering & Manufacturing North America, Inc., Plano, TX (US)

(72) Inventors: Max P. Herzog, Fenton, MI (US); Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 226 days.

(21) Appl. No.: 17/166,669

(22) Filed: Feb. 3, 2021

(65) Prior Publication Data
US 2022/0178414 A1 Jun. 9, 2022

Related U.S. Application Data
(60) Provisional application No. 63/122,988, filed on Dec. 9, 2020.

(51) Int. Cl.
| | | |
|---|---|---|
| *F16D 65/18* | (2006.01) | |
| *F16D 55/226* | (2006.01) | |
| *F16D 65/095* | (2006.01) | |

(52) U.S. Cl.
CPC ......... *F16D 65/186* (2013.01); *F16D 55/226* (2013.01); *F16D 65/095* (2013.01)

(58) Field of Classification Search
CPC .... F16D 65/186; F16D 55/226; F16D 65/095; F16D 65/14
See application file for complete search history.

(56) References Cited

U.S. PATENT DOCUMENTS
4,629,039 A * 12/1986 Imoto .................. B60T 8/4266
  303/68
6,213,564 B1 * 4/2001 Face, Jr. ................ F16D 65/16
  303/3

(Continued)

FOREIGN PATENT DOCUMENTS
| | | |
|---|---|---|
| EP | 1650463 A1 | 4/2006 |
| JP | 2004229482 A | 8/2004 |

(Continued)

OTHER PUBLICATIONS
Document No. WO 2018/175741 to Keplinger et al. dated Sep. 27, 2018.*

(Continued)

*Primary Examiner* — Pamela Rodriguez
(74) *Attorney, Agent, or Firm* — Dinsmore & Shohl LLP

(57) ABSTRACT

A braking system that includes a translatable braking mechanism selectively engageable with a wheel assembly, one or more artificial muscles contacting a support plate and disposed adjacent the translatable braking mechanism. Each of the one or more artificial muscles includes a housing having an electrode region and an expandable fluid region, a dielectric fluid housed within the housing, and an electrode pair positioned in the electrode region of the housing, the electrode pair having a first electrode and a second electrode. The electrode pair is actuatable between a non-actuated state and an actuated state such that actuation from the non-actuated state to the actuated state directs the dielectric fluid into the expandable fluid region, expanding the expandable fluid region thereby applying pressure to the translatable braking mechanism, inducing frictional engagement between the translatable braking mechanism and the wheel assembly.

15 Claims, 11 Drawing Sheets

(56) References Cited

U.S. PATENT DOCUMENTS

| | | | |
|---|---|---|---|
| 7,395,903 B2* | 7/2008 | Takahashi | F16D 65/22 |
| | | | 188/335 |
| 10,526,042 B2 | 1/2020 | Guida | |
| 11,413,746 B2* | 8/2022 | Rowe | B25J 9/1075 |
| 11,491,646 B2* | 11/2022 | Rowe | F15B 15/103 |
| 2005/0099254 A1* | 5/2005 | Ohnstein | B25J 18/06 |
| | | | 335/220 |
| 2021/0172460 A1* | 6/2021 | Keplinger | F15B 5/006 |
| 2022/0015933 A1* | 1/2022 | Rowe | A61F 5/012 |
| 2022/0176551 A1* | 6/2022 | Rowe | F15B 15/103 |
| 2022/0239238 A1* | 7/2022 | Rowe | F15B 15/10 |

FOREIGN PATENT DOCUMENTS

| | | | |
|---|---|---|---|
| JP | 2005-230957 A | * | 9/2005 |
| JP | 2012147658 A | | 8/2012 |
| JP | 5603217 B2 | | 10/2014 |
| KR | 100995241 B1 | | 11/2010 |

OTHER PUBLICATIONS

Translation of European Patent No. EP 1650463 obtained from website: https://worldwide.espacenet.com on Nov. 8, 2022.*

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

C. Oertel, et al., "Construction Of A Test Bench For Bicycle Rim And Disc Brakes," 8th Conference of the International Sports Engineering Association (ISEA) Journal, Procedia Engineering Jun. 2010: vol. 2, Issue 2, pp. 2943-2948, University of Applied Sciences Technikum Wien, Höchstädtplatz 5, A-1200 Vienna.

* cited by examiner

BRAKING SYSTEMS COMPRISING ARTIFICIAL MUSCLES

CROSS-REFERENCE TO RELATED APPLICATION

This application claims priority to U.S. Provisional Patent Application No. 63/122,988, filed Dec. 9, 2020, which is hereby incorporated by reference in its entirety including drawings.

TECHNICAL FIELD

The present specification generally relates braking systems for personal mobility devices and, in particular, to braking systems that use artificial muscles for providing provide a braking force to a personal mobility device.

BACKGROUND

Currently, personal mobility devices, such as bicycles, scooters, and, wheelchairs use mechanical and hydraulic braking devices. Operating mechanical and hydraulic brakes often requires user exertion and may be difficult for young and infirm users. Moreover, mechanical and hydraulic brakes increase the weight of the personal mobility device, reducing the operational efficiency of the personal mobility device. Accordingly, a need exists for alternative braking systems that improve the operation and user experience of the personal mobility device without sacrificing design considerations such as longevity, weight, or simplicity.

SUMMARY

In one embodiment, a braking system includes a translatable braking mechanism selectively engageable with a wheel assembly, one or more artificial muscles contacting a support plate and disposed adjacent the translatable braking mechanism. Each of the one or more artificial muscles includes a housing having an electrode region and an expandable fluid region, a dielectric fluid housed within the housing, and an electrode pair positioned in the electrode region of the housing, the electrode pair having a first electrode and a second electrode. The electrode pair is actuatable between a non-actuated state and an actuated state such that actuation from the non-actuated state to the actuated state directs the dielectric fluid into the expandable fluid region, expanding the expandable fluid region thereby applying pressure to the translatable braking mechanism, inducing frictional engagement between the translatable braking mechanism and the wheel assembly.

In another embodiment, a method for engaging a translatable braking mechanism with a wheel assembly includes providing a voltage using a power supply electrically coupled to an electrode pair of an artificial muscle, the artificial muscle contacting a support plate and disposed adjacent the translatable braking mechanism. The artificial muscle includes a housing having an electrode region and an expandable fluid region. The electrode pair is positioned in the electrode region of the housing. The electrode pair includes a first electrode and a second electrode and a dielectric fluid is housed within the housing. The method also includes applying the voltage to the electrode pair of the artificial muscle, thereby actuating the electrode pair from a non-actuated state to an actuated state such that the dielectric fluid is directed into the expandable fluid region of the housing and expands the expandable fluid region, thereby applying pressure to the translatable braking mechanism, inducing frictional engagement between the translatable braking mechanism and the wheel assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
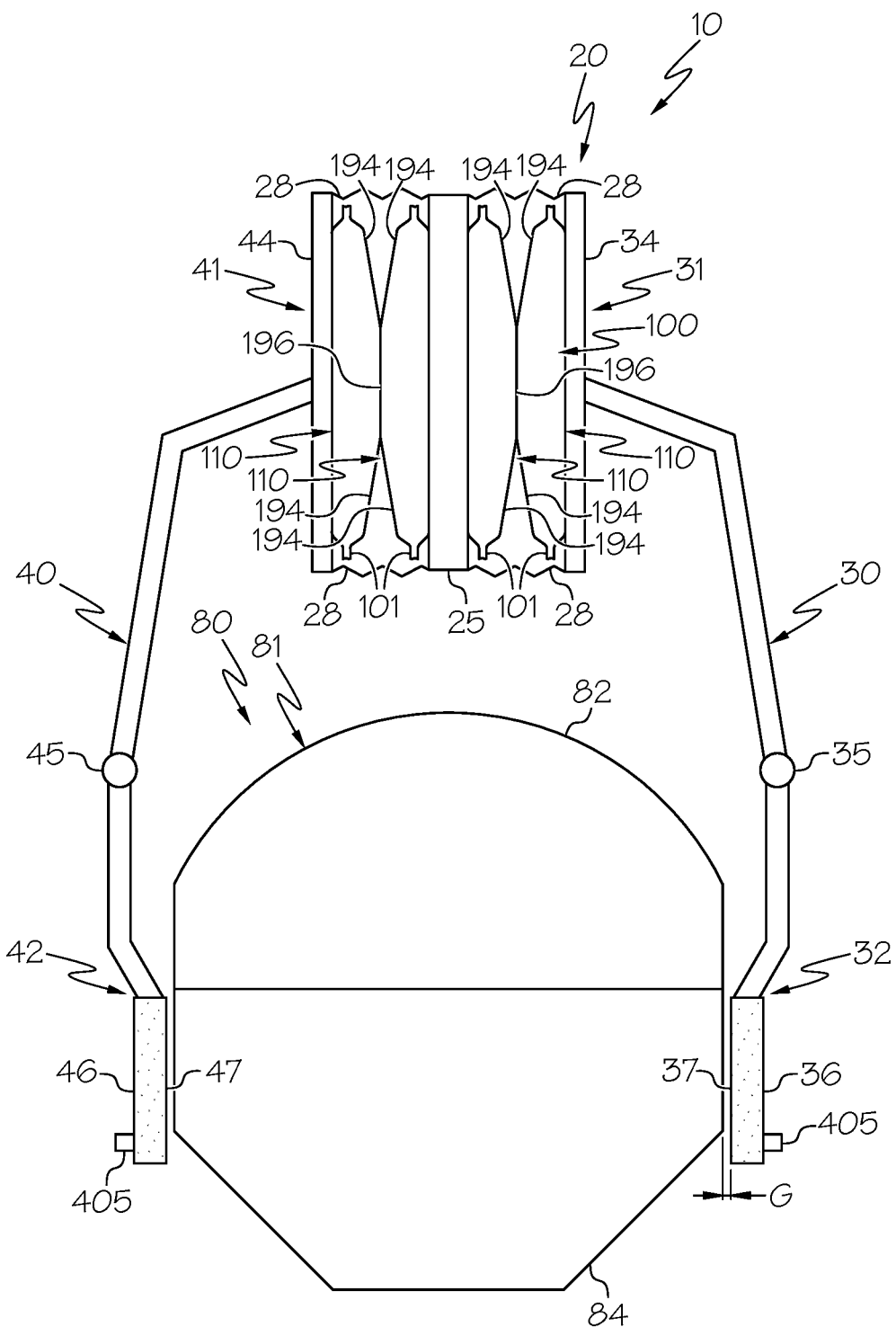
FIG. 1A schematically depicts a braking system with a translatable braking mechanism comprising a first arm and a second arm translatable by actuation of one or more artificial muscles, the translatable braking mechanism in a non-actuated state, according to one or more embodiments shown and described herein.

Embodiments described herein are directed to braking systems that include a translatable braking mechanism selectively engageable with a wheel assembly of a personal mobility device to apply a braking force to the wheel assembly. The braking systems also include one or more artificial muscles coupled to a support plate and disposed adjacent the translatable braking mechanism. The one or more artificial muscles are actuatable to move the translatable braking mechanism into contact with the wheel assembly. The one or more artificial muscles are actuatable to selectively raise and lower a region of the artificial muscles to provide a selective, on demand inflated expandable fluid region. In particular, the one or more artificial muscles each include an electrode pair that may be drawn together by application of a voltage, thereby pushing dielectric fluid into the expandable fluid region, which applies pressure to the translatable braking mechanism to move the translatable braking mechanism into contact with the wheel assembly. Thus, actuation of the one or more artificial muscles of the braking system may apply selective and customizable pressure to the wheel assembly to affect a selective braking force to the personal mobility device. Various embodiments of the braking system and the operation of the braking system are described in more detail herein. Whenever possible, the same reference numerals will be used throughout the drawings to refer to the same or like parts.

Referring now to FIGS. 1A-3B, braking systems 10, 10' are schematically depicted. The braking systems 10, 10' each comprise a translatable braking mechanism 20, 20', a support plate 25, 55 and one or more artificial muscles 101 (such as a plurality of artificial muscles 100) contacting the support plate 25, 55. For example, at least one of the one or more artificial muscles 101 may be coupled to the support plate 25, 55. The translatable braking mechanism 20, 20' is selectively engageable with a wheel assembly 81 of a personal mobility device 80 to affect a braking force on the wheel assembly 81. In operation, the one or more artificial muscles 101 are actuatable in response to an applied voltage and actuation of the one or more artificial muscles 101 applies a translational force to the translatable braking mechanism 20, 20' to move at least a portion of the translatable braking mechanism 20, 20' into contact with at least a portion of the wheel assembly 81 to apply a braking force to the personal mobility device 80. A non-exhaustive list of example personal mobility devices 80 that the braking systems 10, 10' described herein may be incorporated into include electric scooters, electric automobiles, unicycles, two-wheeled scooters, tricycles, riding lawn mowers, walk-behind lawn mowers (including self-propelled walk behind mowers), go-carts, all-terrain vehicles (including 2 wheel, 4-wheel, 5-wheel, and 6-wheel ATVs), a trailer brake system for agricultural equipment, construction equipment, recreational vehicles, any other towed equipment, as well as a braking system for ultralight airplanes and gliding airplanes.

Figure 1B:
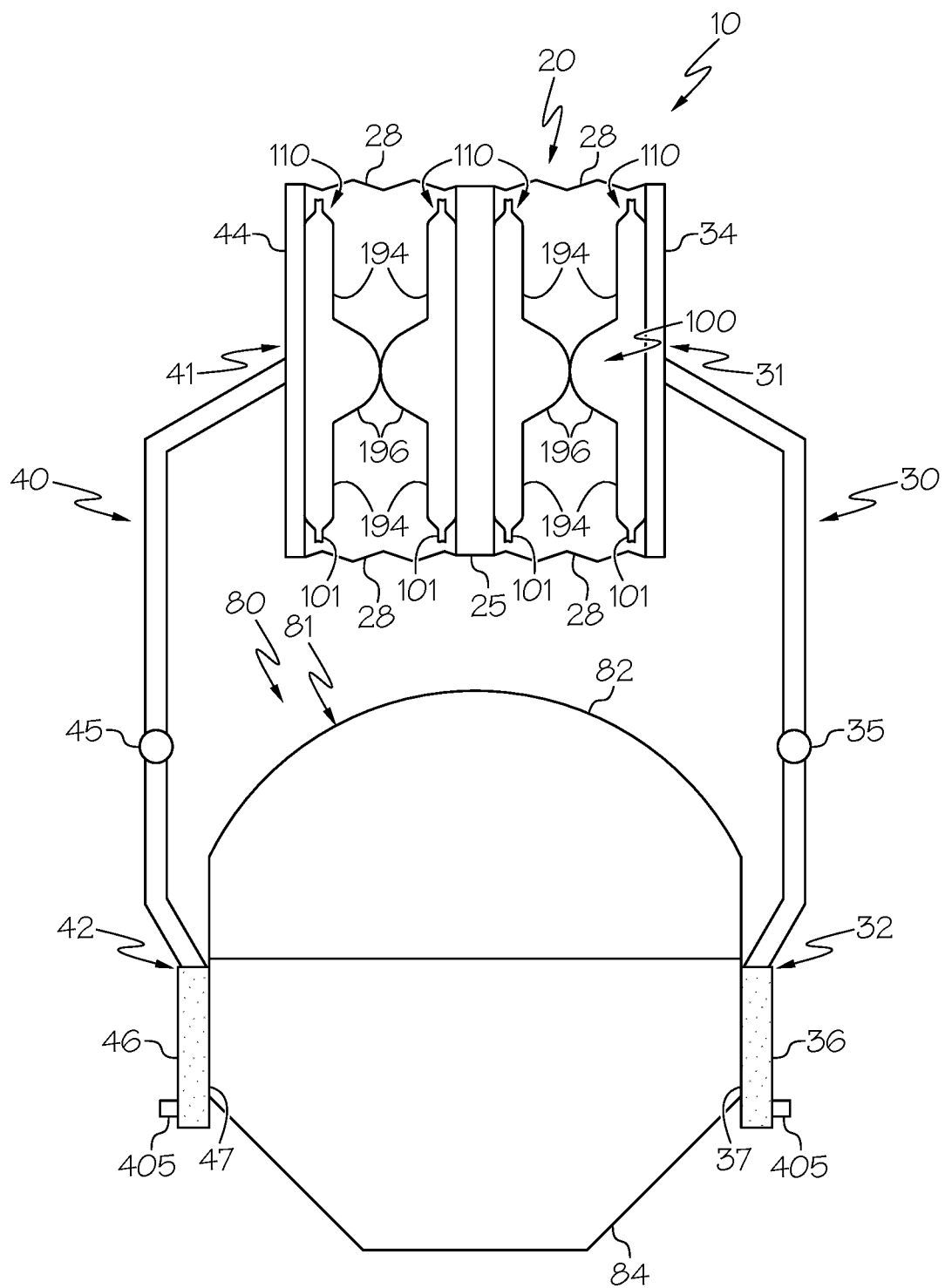
FIG. 1B schematically depicts the braking system with a translatable braking mechanism of FIG. 1A in an actuated state, according to one or more embodiments shown and described herein.

Referring now to FIGS. 1A and 1B, the braking system 10 comprises a V-brake system and the translatable braking mechanism 20 of the braking system 10 comprises a first arm 30 and a second arm 40. The first arm 30 comprises a first end 31 opposite a second end 32 and the second arm comprises a first end 41 opposite a second end 42. An end plate 34 is coupled to the first end 31 of the first arm 30 and an end plate 44 is coupled to the second end 42 of the second arm 40. A friction pad 36 is coupled to the second end 32 of the first arm 30 and a friction pad 46 is coupled to the second end 42 of the second arm 40. The braking system 10 further comprises a support plate 25 disposed between the end plate 34 of the first arm 30 and the end plate 44 of the second arm 40. At least one artificial muscle 101 is disposed between the support plate 25 and the end plate 34 of the first arm 30 and at least one artificial muscle 101 is disposed between the support plate 25 and the end plate 44 of the second arm 40. In some embodiments, as shown in FIGS. 1A and 1B, a stack of artificial muscles 101 is disposed between the support plate 25 and the end plate 34 of the first arm 30 and a stack of artificial muscles 101 is disposed between the support plate 25 and the end plate 44 of the second arm 40. Furthermore, actuation of the one or more artificial muscles 101 may be controlled by an actuation system 400 (FIG. 11), which may be incorporated into the personal mobility device 80. While the braking system 10 is actuated using one or more artificial muscles 101, the braking system 10 may also include a backup mechanical actuation system for manually drawing the friction pads 36, 46 into contact with the rim 84.

The braking system 10 further comprises a plurality of return springs 28 that connect the support plate 25 with the end plates 34, 44. In particular, the end plate 34 of the first arm 30 is coupled to the support plate 25 by at least one return spring 28 (two in the embodiment depicted in FIGS. 1A and 1B) and the end plate 44 of the second arm 40 is coupled to the support plate 25 by at least one second return spring 28 (two in the embodiment depicted in FIGS. 1A and 1B). The plurality of return springs 28 bias the end plate 34 of the first arm 30 toward the support plate 25 and also bias the end plate 44 of the second arm 40 toward the support plate 25. Indeed, the plurality of return springs 28 bias the end plates 34, 44 toward one another.

Referring still to FIGS. 1A and 1B, the friction pad 36 of the first arm 30 and the friction pad 46 of the second arm 40 are each adjacent to and selectively engageable with the wheel assembly 81, in particular, a rim 84 of the wheel assembly 81. In some embodiments, the friction pads 36, 46 may comprise one or more organic high friction materials, such as rubber, carbon, glass, fiberglass, and synthetic fibers that are bound together using a resin material. In some embodiments, the friction pads 36, 46 may comprise one or more ceramic high friction materials, such as ceramics embedded with copper fibers. In some embodiments, the friction pads 36, 46 may comprise one or more metallic high friction materials, such as copper, iron, steel, or other composite alloys that may further include a graphic lubricant. In operation, the friction pads 36, 46 are selectively engageable with the rim 84 to apply a frictional force to the wheel assembly 81 and affect a rotation of the wheel assembly 81, slowing movement of the personal mobility device 80. The first arm 30 and the second arm 40 of the translatable braking mechanism 20 further comprise a joint 35, 45, such as a ball joint, that provides a pivot point for each arm 30, 40 during operation of the translatable braking mechanism 20. In particular, when the end plates 34, 44 of the first and second arms 30, 40 are pushed away from one another by actuation of the one or more artificial muscles 101, the first and second arms 30, 40 each pivot at their respective joints 35, 45, and the friction pads 36, 46 of the first and second arms 30, 40 translate toward one another and toward the rim 84 of the wheel assembly 81.

The one or more artificial muscles 101 each include an electrode pair 104 disposed in a housing 110 together with a dielectric fluid 198 (FIGS. 5-10). The electrode pair 104 is disposed in an electrode region 194 of the housing 110, adjacent an expandable fluid region 196. In operation, voltage may be applied to the electrode pair 104, drawing the electrode pair 104 together, which directs dielectric fluid into the expandable fluid region 196, expanding the expandable fluid region 196. In FIG. 1A, the one or more artificial muscles 101 are each in a non-actuated state. When the plurality of artificial muscles 100 are not actuated, a gap G is present between both friction pads 36, 46, and the rim 84 of the wheel assembly 81. As the plurality of return springs 28 bias the end plates 34, 44 toward one another, the plurality of return springs 28 also bias the friction pads 36, 46 away from the rim 84. When the gap G is present, a braking force is not being applied to the rim 84 by the friction pads 36, 46. Actuating the one or more artificial muscles 101 translates the end plates 34, 44, away from the support plate 25 (and each other) and pivots the second ends 32, 42 of the first and second arms 30, 40 and the friction pads 36, 46 toward the rim 84. When the plurality of artificial muscles 100 are actuated, the size of the gap G is reduced and contact surfaces 37, 47 of the friction pads 36, 46 may be translated into contact with the rim 84, as shown in FIG. 1B. Moreover, when the contact surface 37, 47 of friction pads 36, 46 contact the rim 84, the force applied by the friction pads 36, 46 to the rim 84 may be increased or decreased based on the voltage applied to each electrode pair 104 of the one or more artificial muscles 101 disposed between the support plate 25 and the end plates 34, 44. In operation, when the tire 82 and rim 84 are rotating, voltage may be applied to the electrode pair 104 of the one or more artificial muscles 101 to actuate the one or more artificial muscles 101 and induce frictional engagement between the contact surface 37, 47 of friction pads 36, 46 and the rim 84, thereby reducing a rotational speed of the tire 82 and the rim 84 of the wheel assembly 81.

Referring still to FIGS. 1A and 1B, the braking system 10 may also include sensors 405, such as tachometers, pressure sensors, proximity sensors, temperature sensors, or the combinations thereof. In some embodiments, the sensors 405 may facilitate the operation of anti-lock braking using the braking system 10. The sensors 405 may also measure wear on the friction pads 36, 46 and allow the actuation system 400 to inform a user when it is time to change the friction pads 36, 46.

Figure 2:
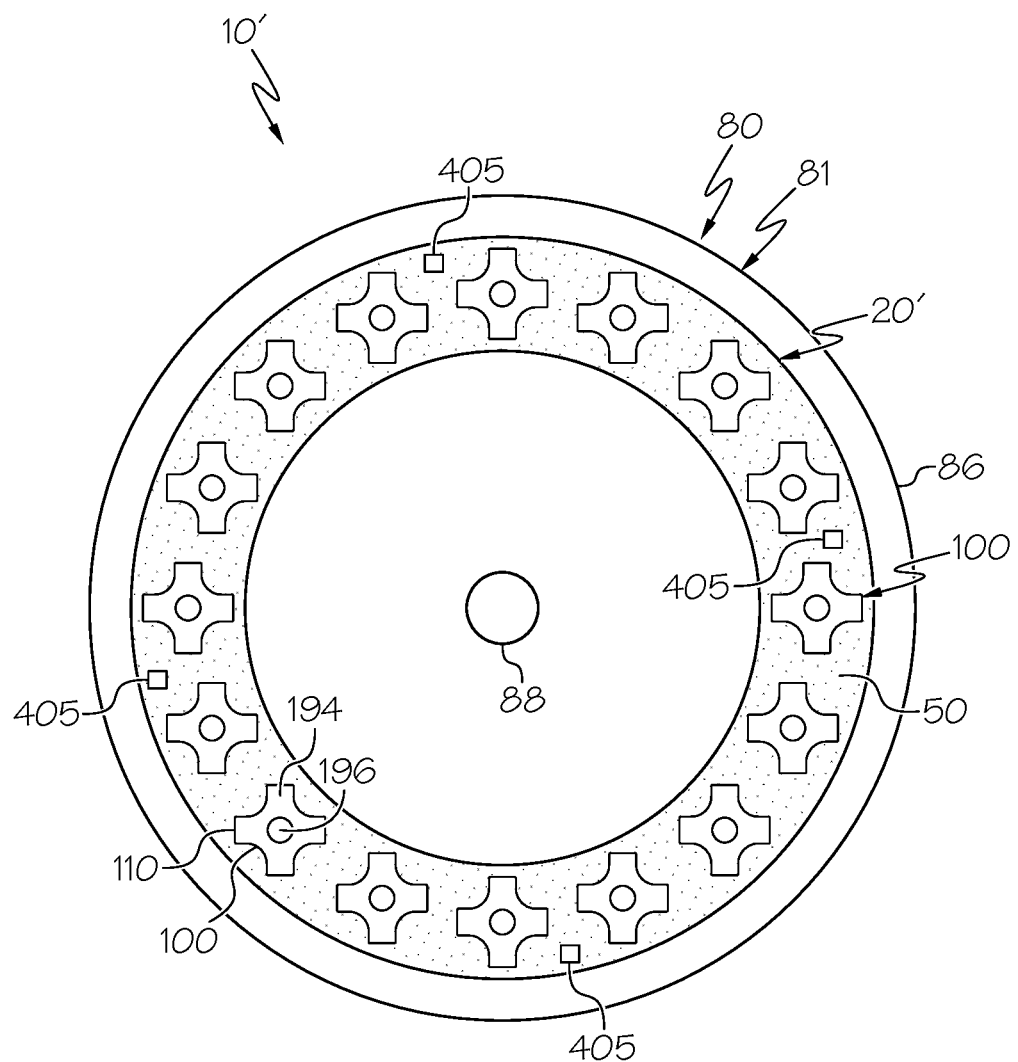
FIG. 2 schematically depicts a front view of braking system with translatable mechanism comprising a friction pad translatable by actuation of one or more artificial muscles, according to one or more embodiments shown and described herein.
Figure 3A:
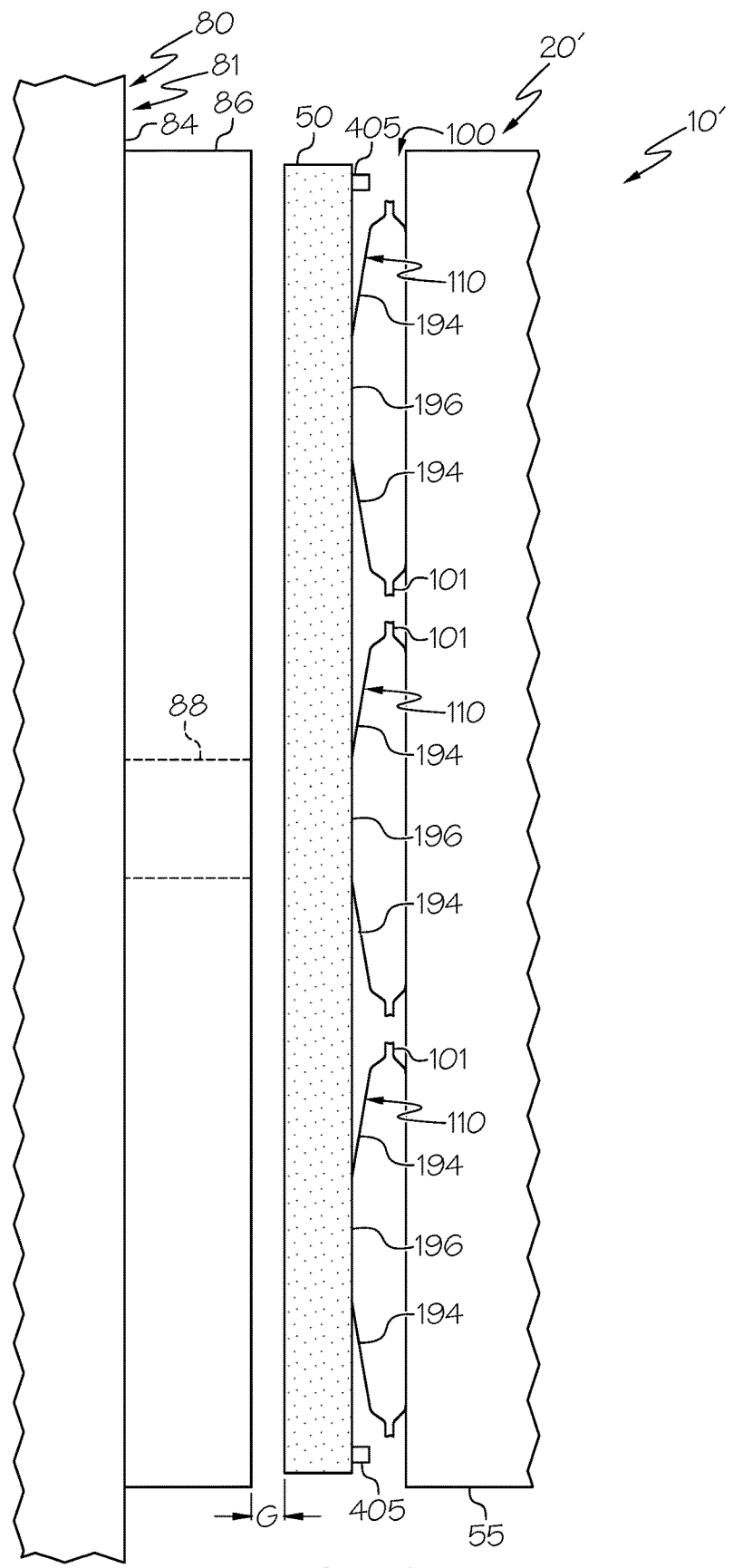
FIG. 3A schematically depicts a side view of the braking system of FIG. 2 with the translatable braking system comprising the friction pad in a non-actuated state, according to one or more embodiments shown and described herein.
Figure 3B:
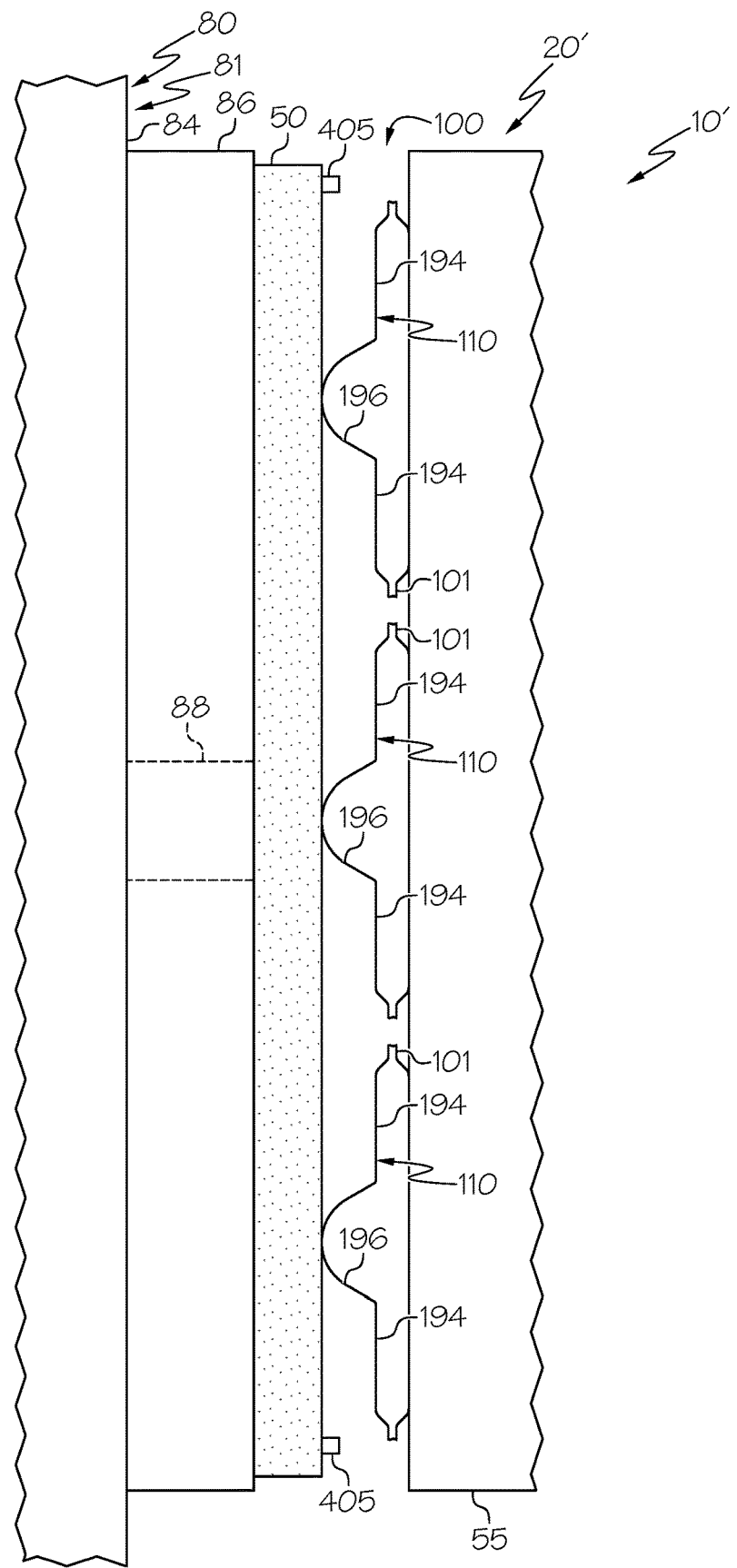
FIG. 3B schematically depicts a side view of the braking system of FIG. 2 with the translatable braking system comprising the friction pad in an actuated state, according to one or more embodiments shown and described herein.

Referring now to FIGS. 2, 3A, and 3B, the braking system 10' comprises a disc brake system and the translatable braking mechanism 20' of the braking system 10' comprises a friction pad 50. The braking system 10' further comprises a support plate 55 and at least one artificial muscle 101 (such as a plurality of artificial muscles 100) is positioned between the support plate 55 and the friction pad 50 in contact with the support plate 55, for example, coupled to the support plate 55. The friction pad 50 may comprise any of the materials of the friction pads 36, 46, described above. In some embodiments, as shown in FIG. 2, the friction pad 50 is an annular friction pad 50. However, it should be understood that the friction pad 50 may comprise a variety of shapes, such as an arced shape, a rectilinear shape, or the like.

Referring still to FIGS. 2, 3A, and 3B, the wheel assembly 81 comprises the tire 82 and the rim 84, as also depicted in the embodiments of FIGS. 1A and 1B, and further comprises a braking disc 86 arranged around a wheel hub 88. The braking disc 86 is coupled to the wheel hub 88 such that the braking disc 86 rotates together with the tire 82 and the rim 84. As shown in FIGS. 3A and 3B, the friction pad 50 of the braking system 10' is adjacent to and selectively engageable with the braking disc 86. Indeed, engagement of the friction pad 50 with the braking disc 86 applies a braking force to the braking disc 86 and thereby the wheel assembly 81. Moreover, as shown in FIG. 2, a plurality of artificial muscles 100 may be positioned in an annular fashion (i.e., circumferentially arranged) on the support plate 55 such that the plurality of artificial muscles 100 are circumferentially adjacent the friction pad 50 (e.g., an annular friction pad).

In FIG. 3A, the one or more artificial muscles 101 are each in a non-actuated state. When the plurality of artificial muscles 100 are not actuated, a gap G is present between the friction pad 50 and the braking disc 86 of the wheel assembly 81. When the gap G is present, a braking force is not being applied to the braking disc 86 by the friction pad 50. Actuating the one or more artificial muscles 101 translates the friction pad 50 toward the braking disc 86. When the one or more artificial muscles 101 are actuated, the size of the gap G is reduced and the friction pad 50 may be translated into contact with the braking disc 86, as shown in FIG. 3B. Moreover, when the friction pads 50 contact the braking disc 86, the force applied by the friction pad 50 to the rim 84 may be increased or decreased based on the voltage applied to each electrode pair 104 of the one or more artificial muscles 101 disposed between the support plate 55 and the friction pad 50. Actuation of the one or more artificial muscles 101 may be controlled by an actuation system 400 (FIG. 11), which may be incorporated into the personal mobility device 80. In operation, when the wheel assembly 81 is rotating, voltage may be applied to the electrode pair 104 of the one or more artificial muscles 101 to actuate the one or more artificial muscles 101 and induce frictional engagement between the friction pad 50 and the braking disc 86 of the wheel assembly 81, thereby reducing a rotational speed of the wheel assembly 81. Furthermore, while the braking system 10' is actuated using one or more artificial muscles 101, the braking system 10 may also include a coaster brake to provide a backup braking mechanism.

Referring still to FIGS. 2-3B, the braking system 10' may also include sensors 405, such as tachometers, pressure sensors, proximity sensors, temperature sensors, or the combinations thereof. In some embodiments, the sensors 405 may facilitate the operation of anti-lock braking using the braking system 10'. The sensors 405 may also measure wear on the friction pad 50 and allow the actuation system 400 to inform a user when it is time to change the friction pad 50.

Figure 4:
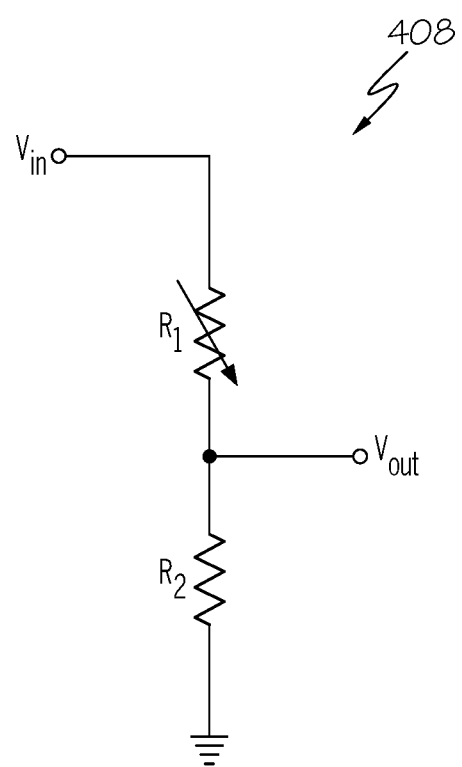
FIG. 4 schematically depicts a circuit diagram of a power supply for providing voltage to the one or more artificial muscles of the braking systems of FIGS. 1A-3B, according to one or more embodiments shown and described herein.

In operation, the one or more artificial muscles 101 may be selectively actuated in groups to allow for a variable output braking force. This braking force can be fine-tuned to fit a user's needs. For example, FIG. 4 depicts an embodiment of a power supply 408 of the actuation system 400 that facilitates variable voltage application to the one or more artificial muscles 101 to control the force applied by the actuation of the one or more artificial muscles 101. In the embodiment depicted in FIG. 4, the power supply 408 includes a voltage divider circuit that provides variation in the output voltage applied to the one or more artificial muscles 101. FIG. 4 is a schematic circuit diagram which includes a source $V_{in}$, an output voltage $V_{out}$ to one or more groups of artificial muscles 101, a handle resistor controller $R_1$, and a standard resistor $R_2$. The variable voltage may also be achieved using a power supply 408 that includes a high voltage metal-oxide-semiconductor field-effect transistor (MOSFET).

Figure 5:
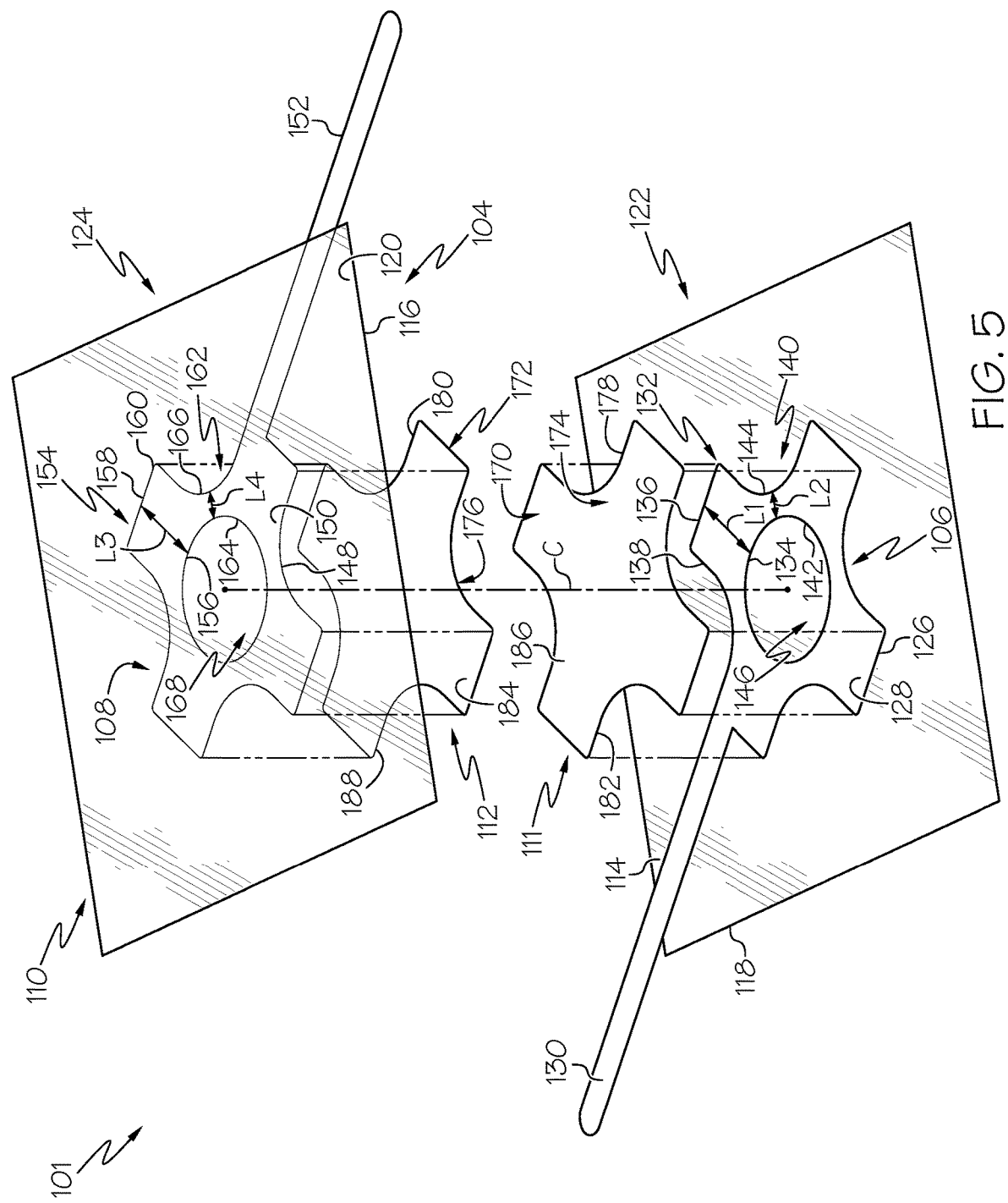
FIG. 5 schematically depicts an exploded view of an illustrative artificial muscle of the braking systems of FIGS. 1-3B, according to one or more embodiments shown and described herein.
Figure 6:
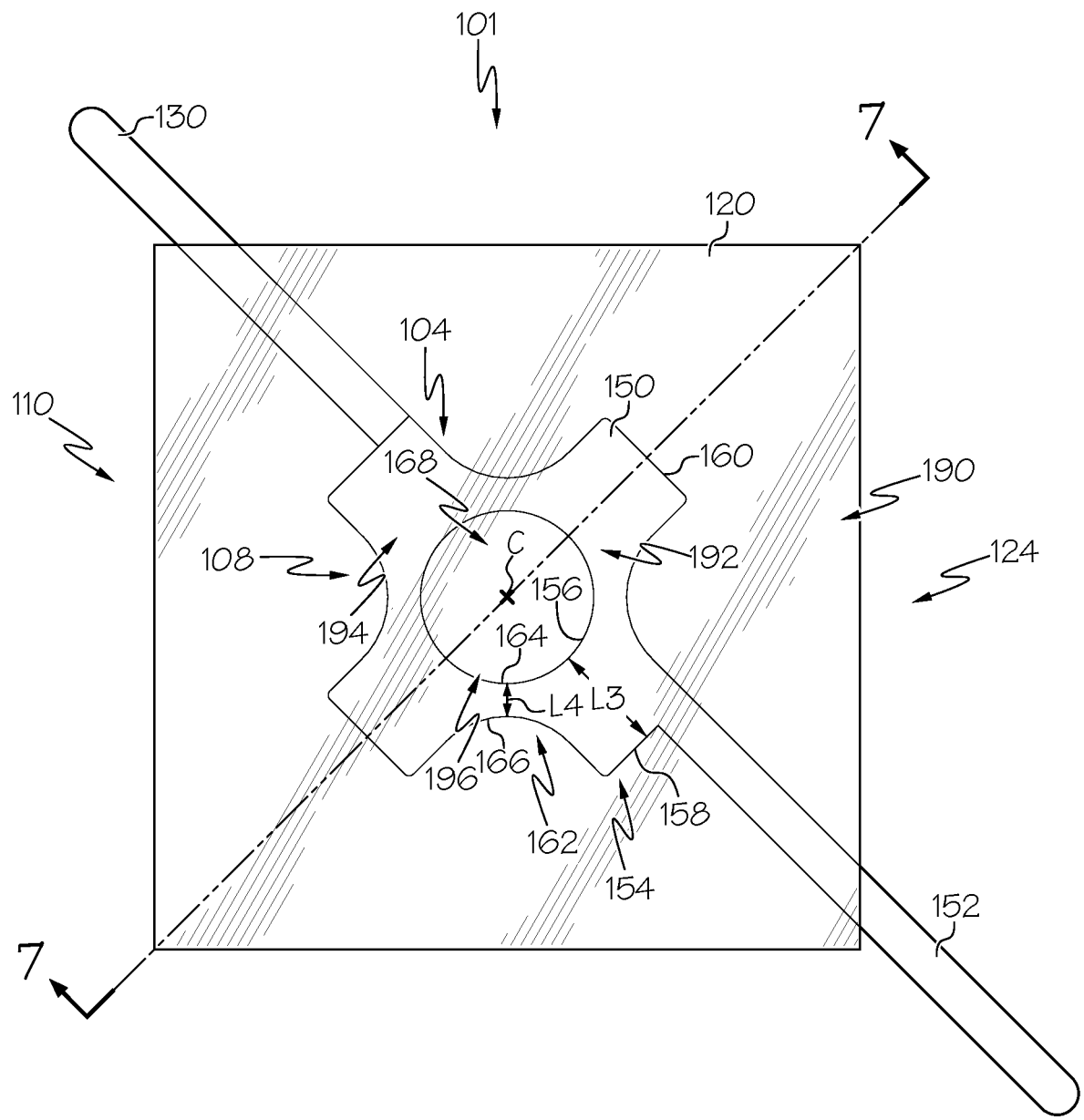
FIG. 6 schematically depicts a top view of the artificial muscle of FIG. 5, according to one or more embodiments shown and described herein.

Referring now to FIGS. 5 and 6, an example artificial muscle 101 of the braking systems 10, 10' is depicted in more detail. The artificial muscle 101 includes the housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 101 is negatively charged.

Figure 11:
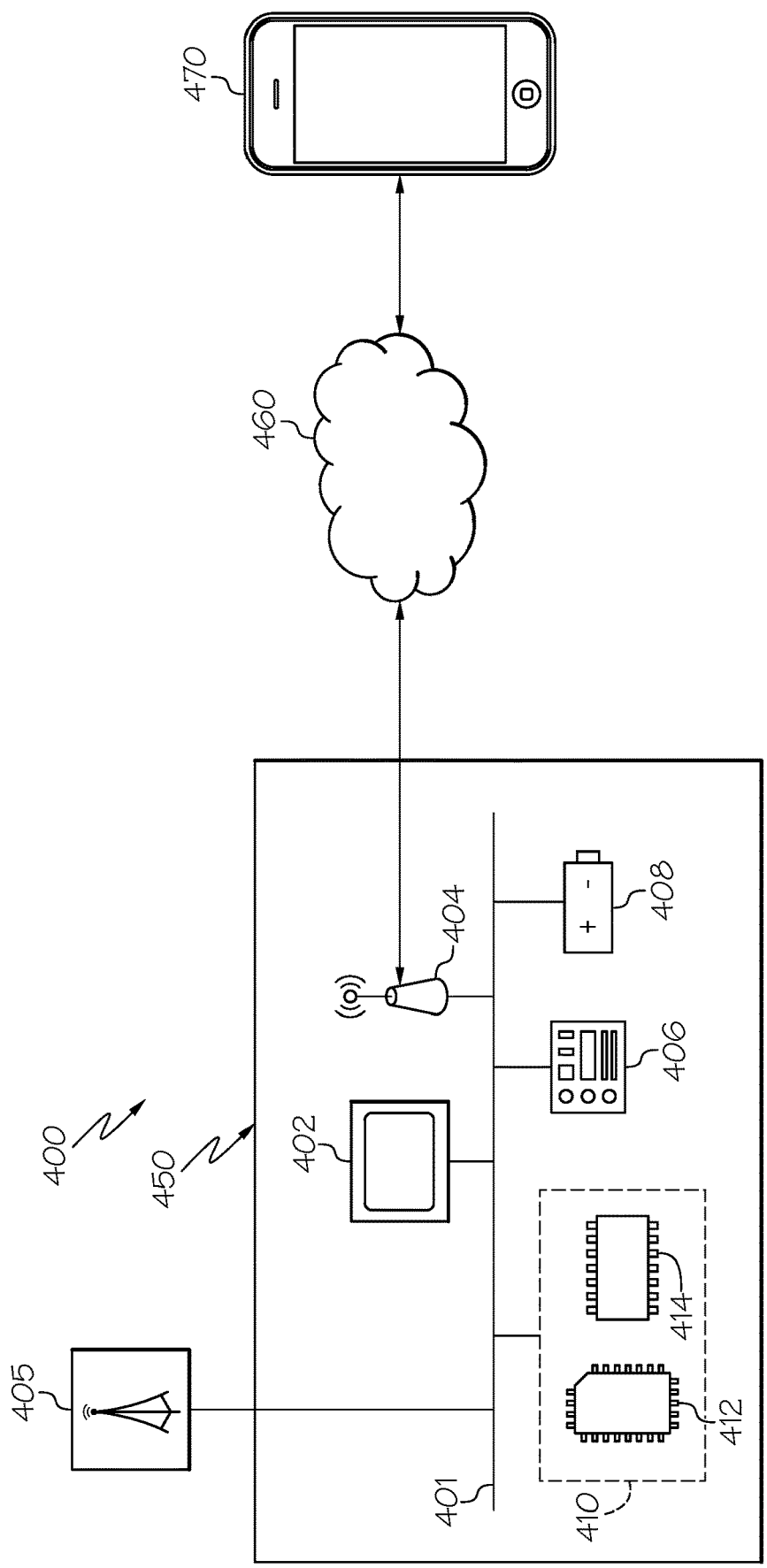
FIG. 11 schematically depicts an actuation system for operating the braking system of FIGS. 1-3B, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400, as shown in FIG. 11. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 5 and 6, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 5 and 6, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 7:
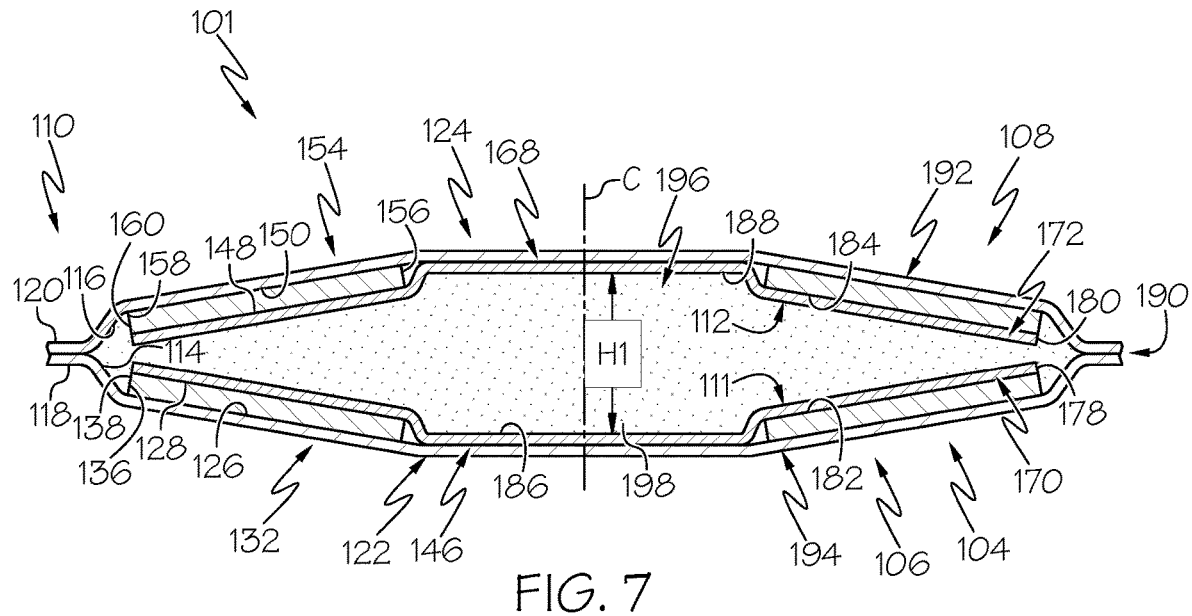
FIG. 7 schematically depicts a cross-sectional view of the artificial muscle of FIG. 5 taken along line 7-7 in FIG. 6 in a non-actuated state, according to one or more embodiments shown and described herein.
Figure 8:
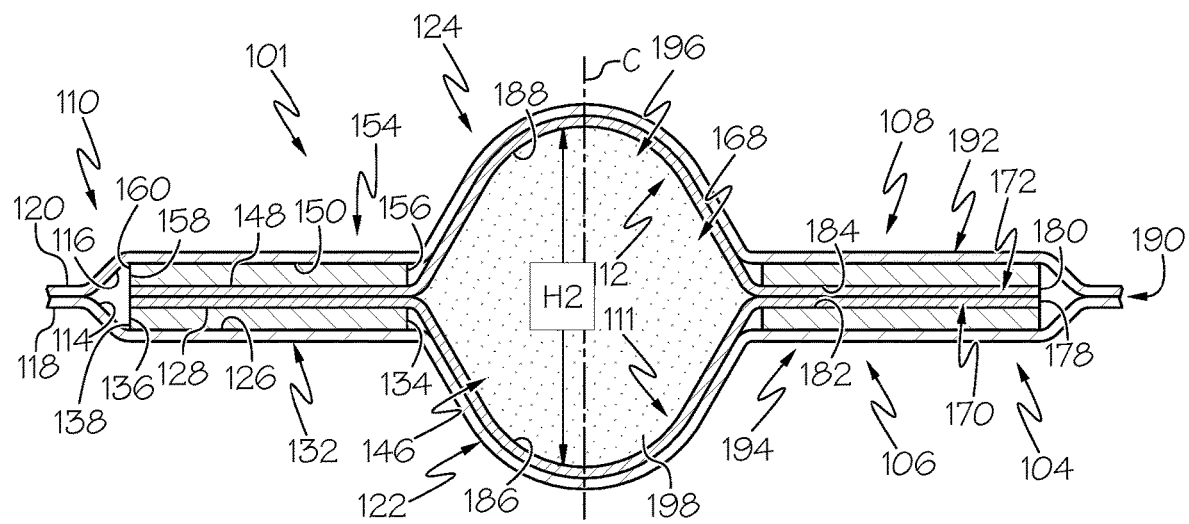
FIG. 8 schematically depicts a cross-sectional view of the artificial muscle of FIG. 5 taken along line 7-7 in FIG. 6 in an actuated state, according to one or more embodiments shown and described herein.
Figure 9:
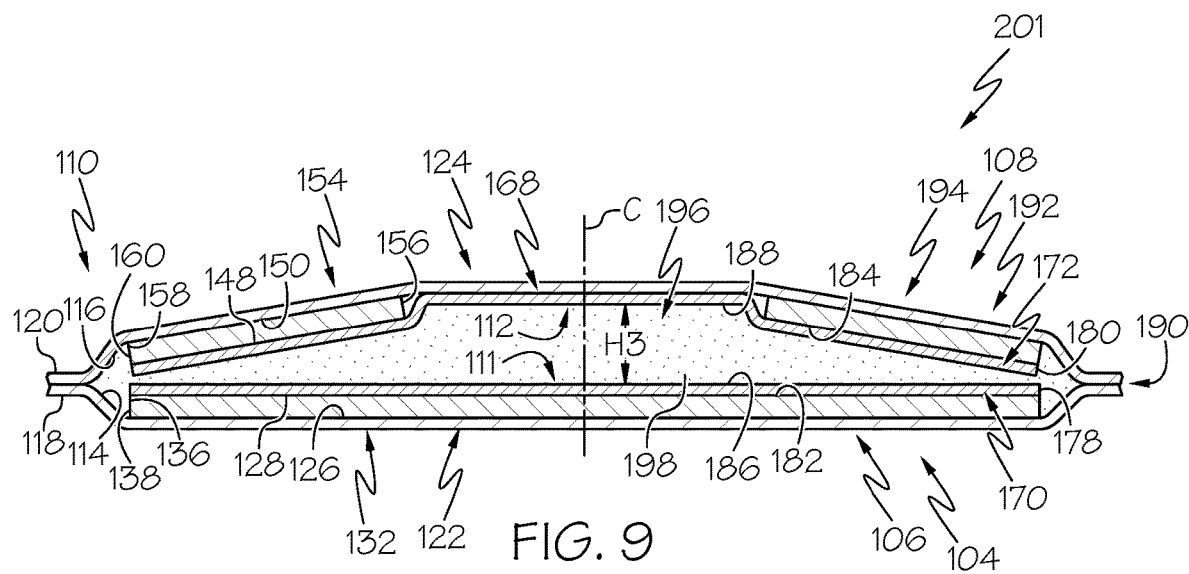
FIG. 9 schematically depicts a cross-sectional view of another illustrative artificial muscle in a non-actuated state, according to one or more embodiments shown and described herein.

Referring now to FIGS. 5-10, at least one of the first electrode 106 and the second electrode 108 has a central opening formed therein between the first end 134 of the tab portions 132 and the first end 142 of the bridge portions 140. In FIGS. 6 and 7, the first electrode 106 has a central opening 146. However, it should be understood that the first electrode 106 does not need to include the central opening 146 when a central opening is provided within the second electrode 108, as shown in FIGS. 8 and 9. Alternatively, the second electrode 108 does not need to include the central opening when the central opening 146 is provided within the first electrode 106. Referring still to FIGS. 5-10, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 6-10, the artificial muscle 101 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 6, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 101, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 101 using a needle or other suitable injection device.

Referring now to FIGS. 7 and 8, the artificial muscle 101 is actuatable between a non-actuated state and an actuated state. In the non-actuated state, as shown in FIG. 7, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In FIGS. 2A, 2C, and 3A, at least one of the one or more artificial muscles 101 of the braking systems 10, 10' is in the non-actuated state. In the actuated state, as shown in FIG. 8, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. In FIGS. 2B, 2C, and 3B, at least one of the one or more artificial muscles 101 of the braking systems 10, 10' is in the actuated state.

Referring now to FIG. 7, the artificial muscle 101 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 7, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 8, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 408 of FIG. 11). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 101 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 101 including two pairs of tab portions 132, 154 on each of the first electrode 106 and the second electrode 108, respectively, reduces the overall mass and thickness of the artificial muscle 101, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 101 provide zipping fronts that result in increased actuation power by providing localized and uniform hydraulic actuation of the artificial muscle 101 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 101 is actuated by providing a voltage an applying the voltage to the electrode pair 104 of the artificial muscle 101, expansion of the expandable fluid region 196 produces a force of 3 Newton-millimeters (N.mm) per cubic centimeter ($cm^3$) of actuator volume or greater, such as 4 N.mm per $cm^3$ or greater, 5 N.mm per $cm^3$ or greater, 6 N.mm per $cm^3$ or greater, 7 N.mm per $cm^3$ or greater, 8 N.mm per $cm^3$ or greater, or the like. Providing the voltage may comprise generating the voltage, for example, in an embodiment in which the power supply 408 (FIGS. 4 and 11) is a battery, converting the voltage, for example in embodiment in which the power supply 408 (FIGS. 4 and 11) is a power adaptor, or any other known or yet to be developed technique for readying a voltage for application. In one example, when the artificial muscle 101 is actuated by a voltage of 9.5 kilovolts (kV), the artificial muscle 101 provides a resulting force of 5 N. In another example, when the artificial muscle 101 is actuated by a voltage of 10 kV the artificial muscle 101 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

Figure 10:
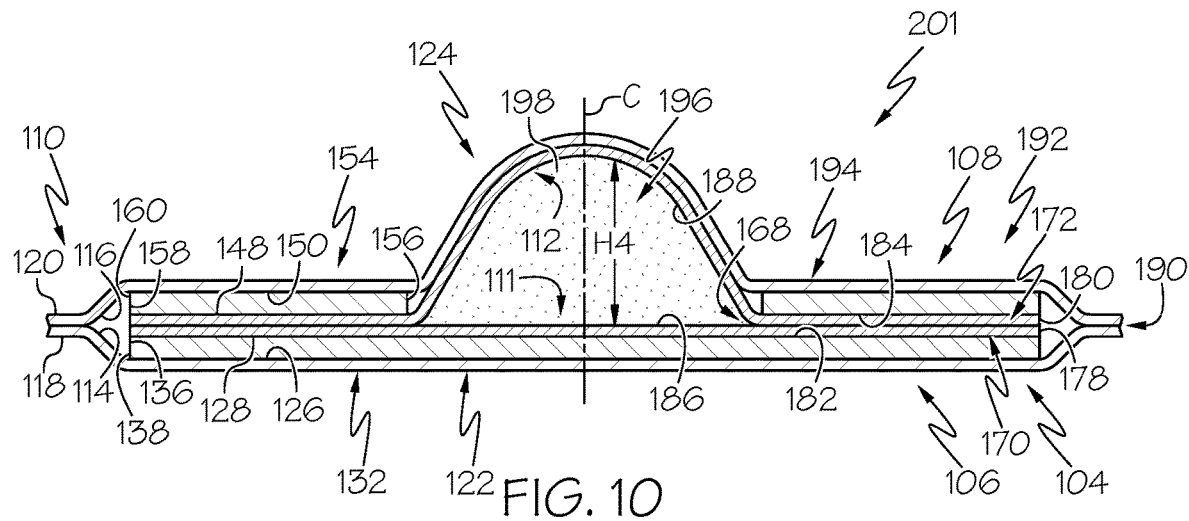
FIG. 10 schematically depicts a cross-sectional view of the artificial muscle of FIG. 9 in an actuated state, according to one or more embodiments shown and described herein.

As shown in FIGS. 9 and 10, another embodiment of an artificial muscle 201 is illustrated. The artificial muscle 201 is substantially similar to the artificial muscle 101. As such, like structure is indicated with like reference numerals. However, as shown, the first electrode 106 does not include a central opening. Thus, only the second electrode 108 includes the central opening 168 formed therein. As shown in FIG. 9, the artificial muscle 201 is in the non-actuated state with the first electrode 106 being planar and the second electrode 108 being convex relative to the first electrode 106. In the non-actuated state, the expandable fluid region 196 has a first height H3. In the actuated state, as shown in FIG. 10, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 201. In addition, because the total deformation is formed on only one side of the artificial muscle 201, the second height H4 of the expandable fluid region 196 of the artificial muscle 201 extends further from a longitudinal axis perpendicular to the central axis C of the artificial muscle 201 than the second height H2 of the expandable fluid region 196 of the artificial muscle 101 when all other dimensions, orientations, and volume of dielectric fluid are the same. It should be understood that embodiments of the artificial muscle 201 may be used together with or in place of the one or more artificial muscles 101 of the braking systems 10, 10' of FIGS. 1A-3B.

Referring now to FIG. 11, an actuation system 400 may be provided for operating the braking systems 10, 10', in particular, operate the or more artificial muscles 101 of the braking systems 10, 10'. The actuation system 400 may comprise a controller 410, an operating device 406, a power supply 408, a display device 402, network interface hardware 404, and a communication path 401 communicatively coupled these components, some or all of which may be disposed in the onboard control unit 450.

The controller 410 comprises a processor 412 and a non-transitory electronic memory 414 to which various components are communicatively coupled. In some embodiments, the processor 412 and the non-transitory electronic memory 414 and/or the other components are included within a single device. In other embodiments, the processor 412 and the non-transitory electronic memory 414 and/or the other components may be distributed among multiple devices that are communicatively coupled. The controller 410 includes non-transitory electronic memory 414 that stores a set of machine-readable instructions. The processor 412 executes the machine-readable instructions stored in the non-transitory electronic memory 414. The non-transitory electronic memory 414 may comprise RAM, ROM, flash memories, hard drives, or any device capable of storing machine-readable instructions such that the machine-readable instructions can be accessed by the processor 412. Accordingly, the actuation system 400 described herein may be implemented in any conventional computer programming language, as pre-programmed hardware elements, or as a combination of hardware and software components. The non-transitory electronic memory 414 may be implemented as one memory module or a plurality of memory modules.

In some embodiments, the non-transitory electronic memory 414 includes instructions for executing the functions of the actuation system 400. The instructions may include instructions for operating the braking systems 10, 10', for example, instructions for actuating the one or more artificial muscles 101, individually or collectively, and actuating the artificial muscles stacks, individually or collectively.

The processor 412 may be any device capable of executing machine-readable instructions. For example, the processor 412 may be an integrated circuit, a microchip, a computer, or any other computing device. The non-transitory electronic memory 414 and the processor 412 are coupled to the communication path 401 that provides signal interconnectivity between various components and/or modules of the actuation system 400. Accordingly, the communication path 401 may communicatively couple any number of processors with one another, and allow the modules coupled to the communication path 401 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 11, the communication path 401 communicatively couples the processor 412 and the non-transitory electronic memory 414 of the controller 410 with a plurality of other components of the actuation system 400, such as the one or more sensors 405. For example, the actuation system 400 depicted in FIG. 11 includes the processor 412 and the non-transitory electronic memory 414 communicatively coupled with the operating device 406 and the power supply 408.

The operating device 406 allows for a user to control operation of the artificial muscles 101 of the braking systems 10, 10'. In some embodiments, the operating device 406 may be a switch, toggle, button, or any combination of controls to provide user operation. The operating device 406 is coupled to the communication path 401 such that the communication path 401 communicatively couples the operating device 406 to other modules of the actuation system 400. The operating device 406 may provide a user interface for receiving user instructions as to a specific operating configuration of the braking systems 10, 10', such as generating a cascading, patterned, stochastic or uniform rhythm.

The power supply 408 (e.g., battery) provides power to the one or more artificial muscles 101 of the braking systems 10, 10'. In some embodiments, the power supply 408 is a rechargeable direct current power source. It is to be understood that the power supply 408 may be a single power supply or battery for providing power to the one or more artificial muscles 101 of the braking systems 10, 10'. A power adapter (not shown) may be provided and electrically coupled via a wiring harness or the like for providing power to the one or more artificial muscles 101 of the braking systems 10, 10' via the power supply 408. Indeed, the power supply 408 is a device that can receive power at one level (e.g., one voltage, power level, or current) and output power at a second level (e.g., a second voltage, power level, or current).

In some embodiments, the actuation system 400 also includes a display device 402. The display device 402 is coupled to the communication path 401 such that the communication path 401 communicatively couples the display device 402 to other modules of the actuation system 400. The display device 402 may be located on or in the personal mobility device 80, for example, as part of the onboard control unit 450, and may output a notification in response to an actuation state of the artificial muscles 101 of the braking systems 10, 10' or indication of a change in the actuation state of the one or more artificial muscles 101 of the braking systems 10, 10'. Moreover, the display device 402 may be a touchscreen that, in addition to providing optical information, detects the presence and location of a tactile input upon a surface of or adjacent to the display device 402. Accordingly, the display device 402 may include the operating device 406 and receive mechanical input directly upon the optical output provided by the display device 402.

In some embodiments, the actuation system 400 includes network interface hardware 404 for communicatively coupling the actuation system 400 to a portable device 470 via a network 460. The portable device 470 may include, without limitation, a smartphone, a tablet, a personal media player, or any other electric device that includes wireless communication functionality. It is to be appreciated that, when provided, the portable device 470 may serve to provide user commands to the controller 410, instead of the operating device 406. As such, a user may be able to control or set a program for controlling the artificial muscles 101 of the braking systems 10, 10' utilizing the controls of the operating device 406. Thus, the artificial muscles 101 of the braking systems 10, 10' may be controlled remotely via the portable device 470 wirelessly communicating with the controller 410 via the network 460.

It should now be understood that embodiments described herein are directed to braking systems for personal mobility devices that actuate using one or more artificial muscles. The braking systems include a translatable braking mechanism that is engageable with a wheel assembly of the personal mobility device to provide a braking force. The translatable braking mechanism may include a pair of arms that each extend between an end plate and a friction pad such that actuation of the artificial muscles may press against the end plates and press the friction pads into contact with the wheel assembly. The translatable braking mechanism may itself be a friction pad, such as an annular friction pad that may be pressed by one or more artificial muscles into contact with the wheel assembly. In operation, actuation of the one or more artificial muscles of the braking system may apply selective and customizable pressure to the wheel assembly to affect a selective braking force to the personal mobility device. This selective braking force may be applied without requiring increased or decreased exertion by a user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A braking system comprising:
a translatable braking mechanism selectively engageable with a wheel assembly, the translatable braking mechanism comprising a first arm comprising a first end and a second end opposite the first end, the first end coupled to a first end plate, the second end coupled to a first friction pad;
one or more artificial muscles contacting a support plate, at least one of the one or more artificial muscles positioned between the support plate and the first end plate of the first arm, wherein each of the one or more artificial muscles comprise:
a housing comprising an electrode region and an expandable fluid region;
a dielectric fluid housed within the housing; and
an electrode pair positioned in the electrode region of the housing, the electrode pair comprising a first electrode and a second electrode, wherein the electrode pair is actuatable between a non-actuated state and an actuated state such that actuation from the non-actuated state to the actuated state directs the dielectric fluid into the expandable fluid region, expanding the expandable fluid region thereby applying pressure to the translatable braking mechanism, inducing frictional engagement between the translatable braking mechanism and the wheel assembly.

2. The braking system of claim 1, wherein:
the translatable braking mechanism comprises a second arm comprising a first end and a second end opposite the first end, the first end coupled to a second end plate, the second end coupled to a second friction pad;
the support plate is disposed between the first end plate of the first arm and the second end plate of the second arm; and
at least one of the one or more artificial muscles is positioned between the support plate and the second end plate of the second arm.

3. The braking system of claim 2, wherein the first end plate of the first arm is coupled to the support plate by at least one return spring and the second end plate of the second arm is coupled to the support plate by at least one return spring.

4. The braking system of claim 3, wherein the return springs bias the first end plate of the first arm toward the support plate and the second end plate of the second arm toward the support plate.

5. The braking system of claim 2, wherein the first friction pad of the first arm and the second friction pad of the second arm are each adjacent to and selectively engageable with the wheel assembly.

6. The braking system of claim 5, wherein:
the wheel assembly comprises a rim coupled to a tire; and
the first friction pad of the first arm and the second friction pad of the second arm are each positioned to engage with the rim of the wheel assembly.

7. The braking system of claim 1, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

8. The braking system of claim 7, wherein the first electrode and the second electrode each includes two pairs of tab portions and two pairs of bridge portions, each bridge portion interconnecting adjacent a pair of adjacent tab portions, each tab portion diametrically opposing an opposite tab portion.

9. The braking system of claim 7, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening of at least one of the first electrode and the second electrode when actuated from the non-actuated state to the actuated state.

10. The braking system of claim 1, wherein the one or more artificial muscles further comprises a first electrical insulator layer fixed to an inner surface of the first electrode opposite a first surface of the housing and a second electrical insulator layer fixed to an inner surface of the second electrode opposite a second surface of the housing, wherein the first electrical insulator layer and the second electrical insulator layer each includes an adhesive surface and an opposite non-sealable surface.

11. A method for engaging a translatable braking mechanism with a wheel assembly, the method comprising:
providing a voltage using a power supply electrically coupled to an electrode pair of an artificial muscle, the artificial muscle contacting a support plate, wherein:
the translatable braking mechanism comprises a first arm comprising a first end and a second end opposite the first end, the first end coupled to a first end plate, the second end coupled to a first friction pad;
the artificial muscle positioned between the support plate and the first end plate of the first arm;
the artificial muscle comprises a housing having an electrode region and an expandable fluid region;
the electrode pair is positioned in the electrode region of the housing;
the electrode pair comprises a first electrode and a second electrode; and
a dielectric fluid is housed within the housing; and
applying the voltage to the electrode pair of the artificial muscle, thereby actuating the electrode pair from a non-actuated state to an actuated state such that the dielectric fluid is directed into the expandable fluid region of the housing and expands the expandable fluid region, thereby applying pressure to the translatable braking mechanism, inducing frictional engagement between the translatable braking mechanism and the wheel assembly.

12. The method of claim 11, wherein:
the translatable braking mechanism comprises a second arm comprising a first end and a second end opposite the first end, the second end coupled to a second end plate, the second end coupled to a second friction pad;
the support plate is disposed between the first end plate of the first arm and the second end plate of the second arm;
the artificial muscle is one of a plurality of artificial muscles; and
at least one of the plurality of artificial muscles is positioned between the support plate and the second end plate of the second arm.

13. The method of claim 12, wherein:
the wheel assembly comprises a rim coupled to a tire;
the first friction pad of the first arm and the second friction pad of the second arm are each adjacent to the rim of the wheel assembly; and
the method further comprises:
rotating the tire and the rim of the wheel assembly prior to applying a voltage to the electrode pair of the artificial muscle and applying the voltage to the electrode pair of at least one of the plurality of artificial muscles such that expansion of the expandable fluid region of the at least one of the plurality of artificial muscles induces frictional engagement between the first friction pad of the first arm and the second friction pad of the second arm and the rim of the wheel assembly, thereby reducing a rotational speed of the tire and the rim of the wheel assembly.

14. The method of claim 11, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

15. The method of claim 14, wherein the first electrode and the second electrode each includes two pairs of tab portions and two pairs of bridge portions, each bridge portion interconnecting adjacent a pair of adjacent tab portions, each tab portion diametrically opposing an opposite tab portion.

* * * * *